(12) United States Patent
Chen

(10) Patent No.: US 8,770,222 B2
(45) Date of Patent: Jul. 8, 2014

(54) AIR PUMP ASSEMBLY FOR A POWER CHUCK

(75) Inventor: Chun-Chih Chen, Changhua Hsien (TW)

(73) Assignee: Autogrip Machinery Co., Ltd., Tai-Ping Village, Pu-Hsin Hsiang Changhua Hsien (TW)

(*) Notice: Subject to any disclaimer, the term of this patent is extended or adjusted under 35 U.S.C. 154(b) by 218 days.

(21) Appl. No.: 13/537,232

(22) Filed: Jun. 29, 2012

(65) Prior Publication Data

US 2014/0001711 A1 Jan. 2, 2014

(51) Int. Cl.
*B23B 31/30* (2006.01)
*F16L 37/56* (2006.01)
*F16L 37/28* (2006.01)

(52) U.S. Cl.
USPC ............ 137/594; 251/149.6; 137/614.03; 279/4.04

(58) Field of Classification Search
USPC ............ 137/594, 614.03, 614.04; 251/149.6; 279/4.04, 4.11, 4.12, 4.1, 110
See application file for complete search history.

(56) References Cited

U.S. PATENT DOCUMENTS

| | | | | |
|---|---|---|---|---|
| 1,697,314 A * | 1/1929 | Gresser | .................... | 137/614.03 |
| 1,782,691 A * | 11/1930 | Krannak | ........................ | 285/101 |
| 2,730,380 A * | 1/1956 | Espy et al. | ............... | 137/614.04 |
| 6,095,191 A * | 8/2000 | Smith, III | ............... | 137/614.04 |
| 6,128,985 A * | 10/2000 | Muster et al. | .................... | 82/1.4 |
| 6,135,150 A * | 10/2000 | Powell et al. | ............ | 137/614.04 |
| 6,357,722 B1 * | 3/2002 | Smith, III | .................. | 251/149.6 |

* cited by examiner

*Primary Examiner* — Eric Keasel
*Assistant Examiner* — David Colon Morales
(74) *Attorney, Agent, or Firm* — Charles E. Baxley

(57) ABSTRACT

An air pump assembly for a power chuck has a frame and two air jet devices. The air jet devices are securely mounted on the frame. Each air jet device has a nozzle and a valve. The nozzle has a main body, a pin and a cap. The pin is mounted in the main body. The cap is mounted around a distal end of the main body and surrounds the pin. The valve may be mounted on a power chuck, faces and aligns with the pin, and has a chunk, a ball and a ball spring. With the air jet devices, the air pump assembly can blow air into a power chuck such that jaws of the power chuck are driven to move.

4 Claims, 7 Drawing Sheets

US 8,770,222 B2

AIR PUMP ASSEMBLY FOR A POWER CHUCK

BACKGROUND OF THE INVENTION

1. Field of the Invention

The present invention relates to an air pump assembly for a power chuck, and more particularly to an air pump assembly for a power chuck to reduce manufacturing and mounting costs.

2. Description of Related Art

A conventional tooling machine has a head body, a spindle, a power chuck and an air pump assembly. The spindle is rotatably and latitudinally mounted on a side surface of the head body and has a distal end. The power chuck is mounted on the distal end of the spindle, is used for clamping a workpiece or a cutter, and has a chuck opening and a chuck passage. The chuck opening is formed in an outer surface of the power chuck. The chuck passage is formed inside the power chuck and communicates with the chuck opening. The air pump assembly has a mounting bracket and an air injection ring. The air injection ring is made of aluminum, is securely mounted on the mounting bracket and surrounds the power chuck.

The air injection ring may be connected with an air source and can be attached to the power chuck. Accordingly, the air injection ring can blow air into the power chuck via the chuck opening to move jaws of the power chuck.

However, the air injection ring is a metal structure with a large volume and the manufacturing cost is expensive. Moreover, a rubber seal mounted in the air injection ring also has a large volume and causes high molding costs.

In addition, the air injection ring needs the mounting bracket to surround the power chuck. To mount the mounting bracket is inconvenient and time-consuming, and a mounting cost, including labor and time consumption, is high.

To overcome the shortcomings, the present invention tends to provide an air pump assembly for a power chuck to mitigate the aforementioned problems.

SUMMARY OF THE INVENTION

The main objective of the invention is to provide an air pump assembly for a power chuck reducing manufacturing and mounting costs.

An air pump assembly for a power chuck has a frame and two air jet devices. The air jet devices are securely mounted on the frame. Each air jet device has a nozzle and a valve. The nozzle has a main body, a pin and a cap. The pin is mounted in the main body. The cap is mounted around a distal end of the main body and surrounds the pin. The valve may be mounted on a power chuck, faces and aligns with the pin, and has a chunk, a ball and a ball spring. With the air jet devices, the air pump assembly can blow air into a power chuck such that jaws of the power chuck are driven to move.

Other objects, advantages and novel features of the invention will become more apparent from the following detailed description when taken in conjunction with the accompanying drawings.

DETAILED DESCRIPTION OF PREFERRED EMBODIMENT

Figure 1:
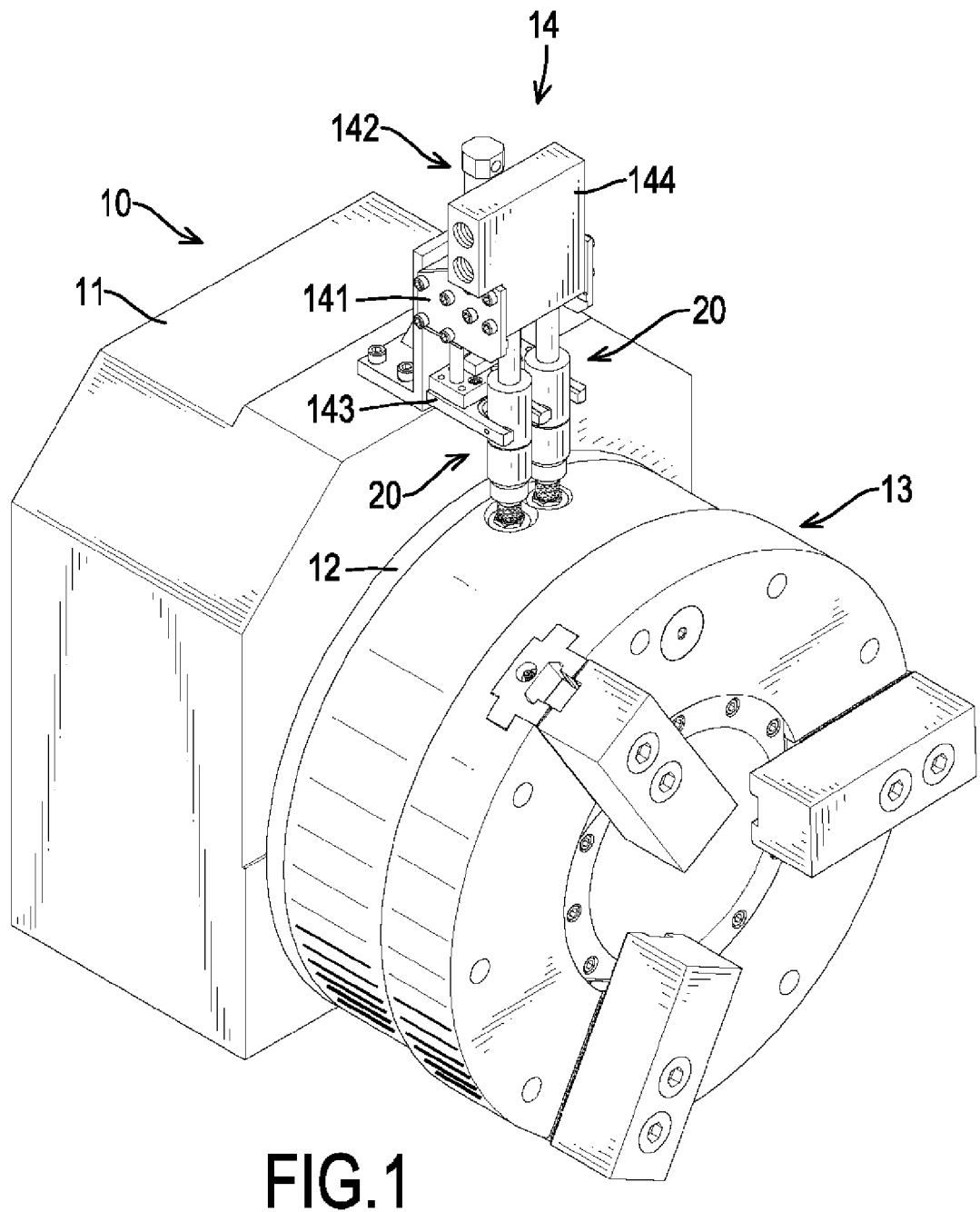
FIG. 1 is a perspective view of an air pump assembly for a power chuck in accordance with the present invention showing that the air pump assembly is mounted on a spindle head of a tooling machine.
Figure 2:
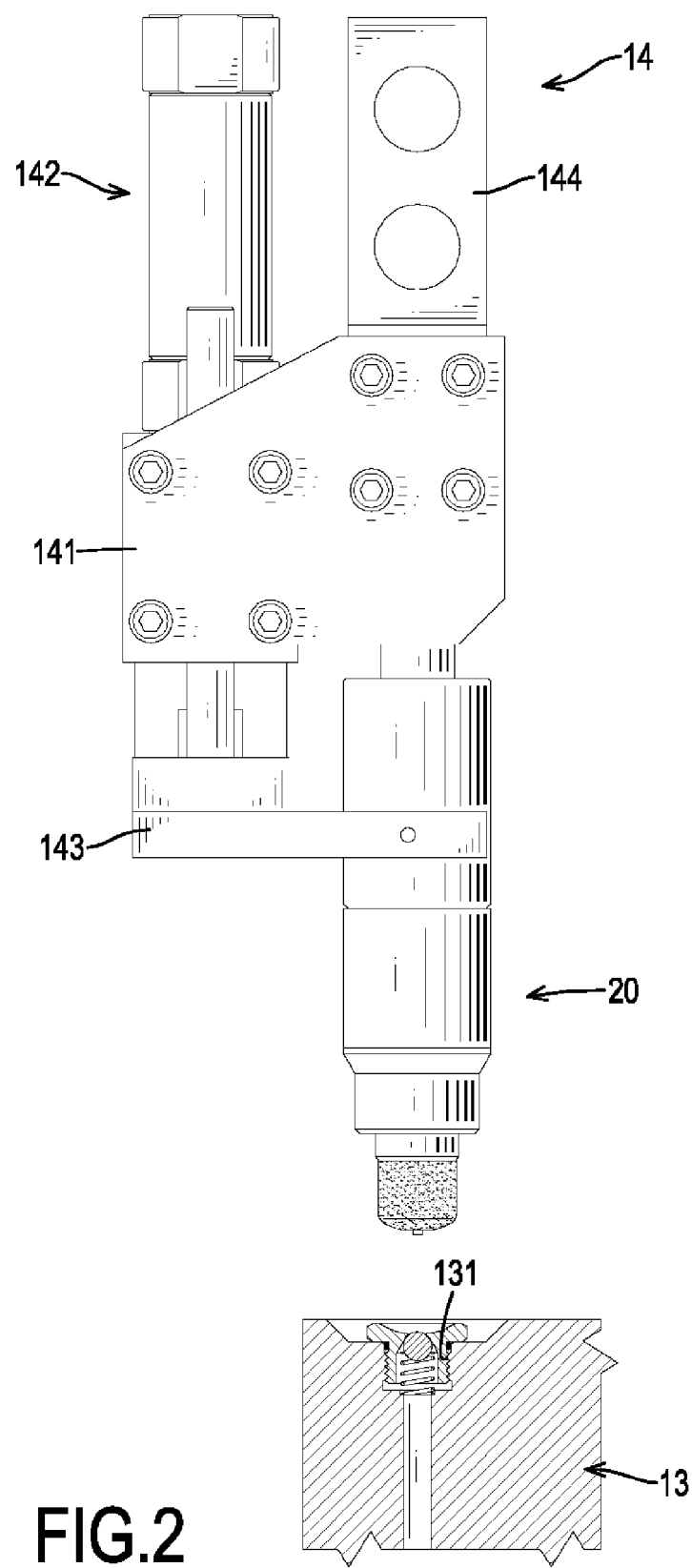
FIG. 2 is an enlarged side view in partial section of the air pump assembly for a power chuck in FIG. 1.
Figure 3:
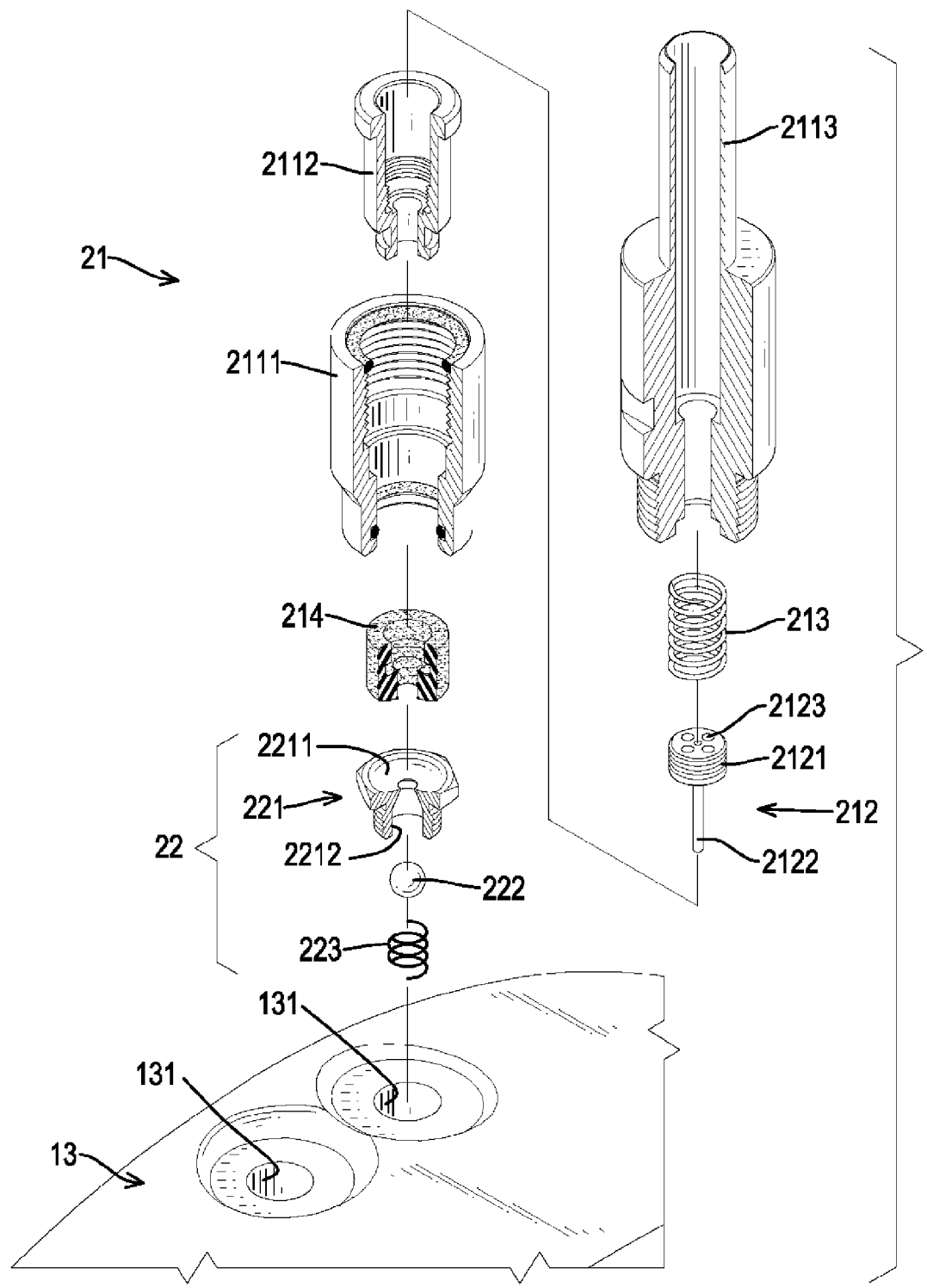
FIG. 3 is an enlarged exploded perspective view in partial section of the air pump assembly for a power chuck in FIG. 1.

With reference to FIGS. 1 to 3, an air pump assembly for a power chuck in accordance with the present invention is mounted on a spindle head 10 of a tooling machine and comprises two air jet devices 20.

Figure 6:
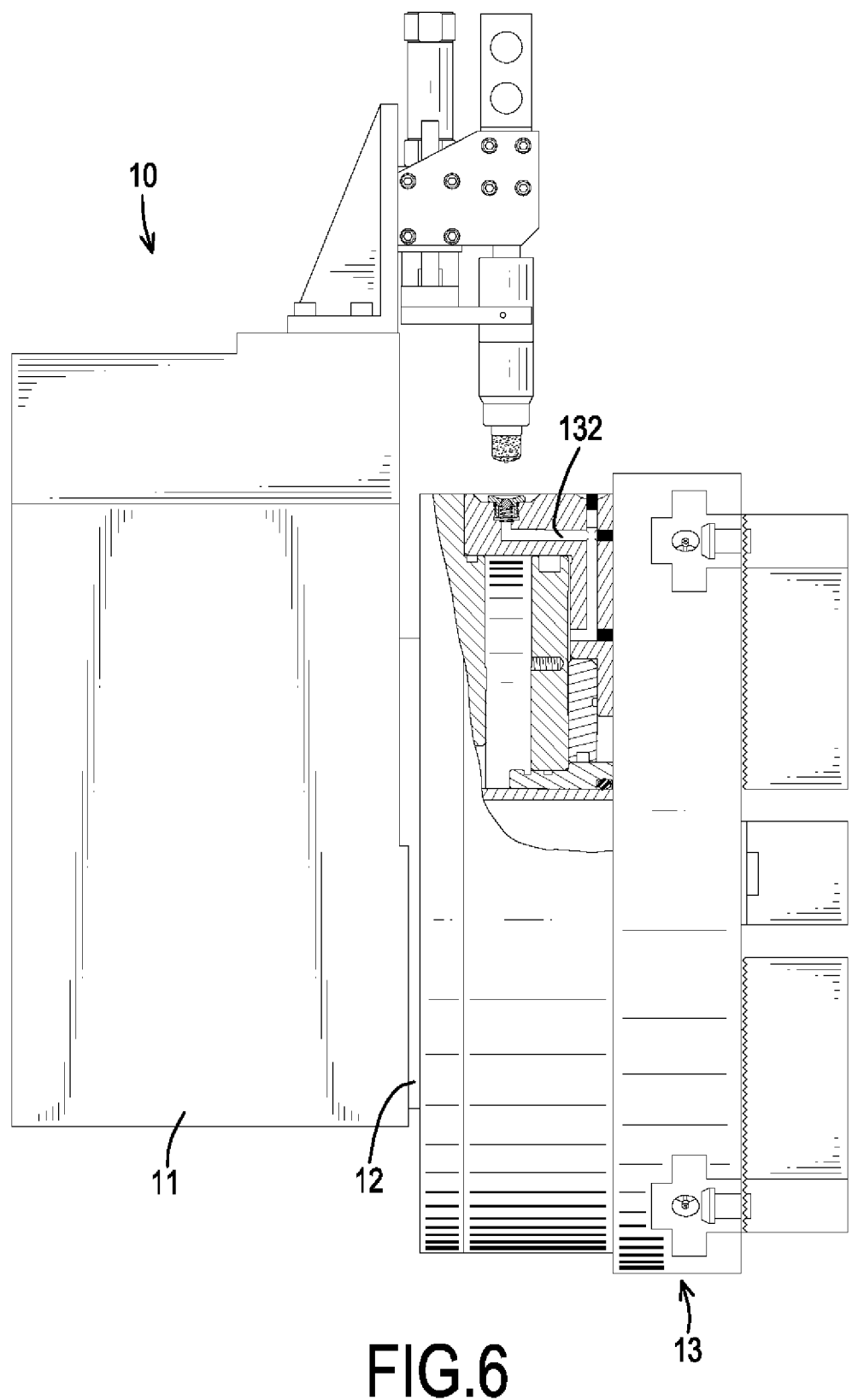
FIG. 6 is a side view in partial section of the air pump assembly for a power chuck in FIG. 1.

With reference to FIGS. 1, 3 and 6, the spindle head 10 has a head body 11, a spindle 12, a power chuck 13 and a cylinder device 14. The head body 11 has a side surface and a top surface. The spindle 12 is rotatably and latitudinally mounted on the side surface of the head body 11 and has a distal end. The power chuck 13 is mounted on the distal end of the spindle 12. The power chuck 13 is cylindrical and has two chuck openings 131 and a chuck passage 132. The chuck openings 131 are formed in a top surface of the power chuck 13. The chuck passage 132 is formed inside the power chuck 13 and communicates with the two chuck openings 131.

Figure 4:
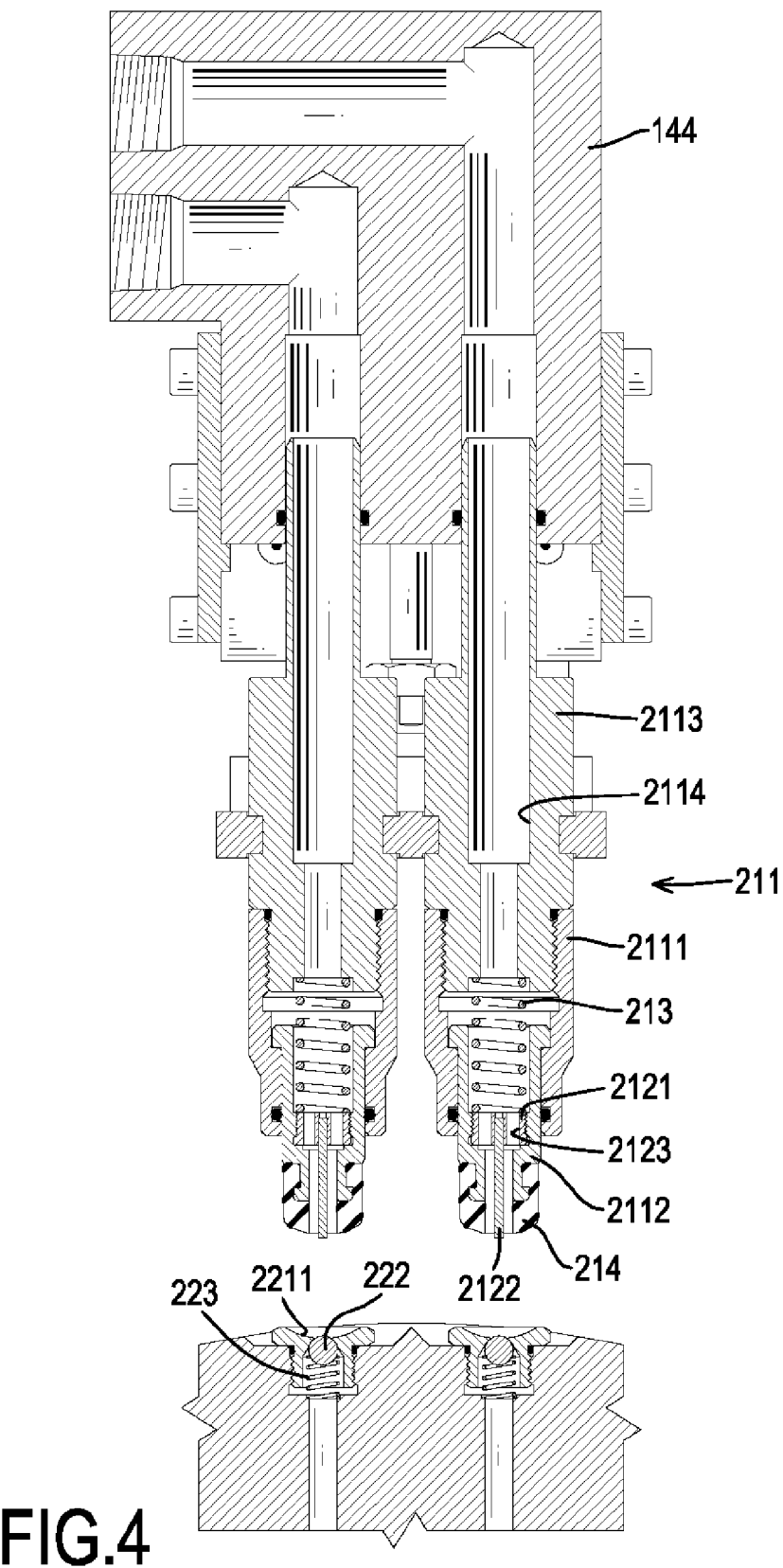
FIG. 4 is an enlarged side view in partial section of the air pump assembly for a power chuck in FIG. 1.

With reference to FIGS. 1, 2 and 4, the cylinder device 14 is located above the power chuck 13 and has a bracket 141, a cylinder 142, a frame 143 and a pump mount 144. The bracket 141 is securely mounted on the top surface of the head body 11 and has a top. The cylinder 142 is securely and longitudinally mounted on the top of the bracket 141 and has a movable cylinder rod. The frame 143 is located under the cylinder 142, is securely connected with the cylinder rod and is capable of being moved longitudinally by the cylinder 142. The pump mount 144 is securely mounted on the top of the bracket 141 and has two air holes. The two air holes are formed inside the pump mount 144 and are respectively connected with the two air jet devices 20.

With reference to FIGS. 2 to 4, the two air jet devices 20 are arranged independently and are not connected with each other. Each air jet device 20 has a nozzle 21 and a valve 22. The two nozzles 21 are securely mounted on the frame 143. The two valves 22 are respectively and securely mounted in the chuck openings 131.

Each nozzle 21 has a main body 211, a pin 212, a pin spring 213 and a cap 214. The main body 211 has an outer tube 2111, an inner tube 2112, a pillar 2113 and a nozzle passage 2114. The outer tube 2111 has a first opening, a second opening and an inner surface. The second opening of the outer tube 2111 is opposite to the first opening of the outer tube 2111. The inner tube 2112 has a first end, a second end and an inner surface. The first end of the inner tube 2112 is securely screwed with the inner surface of the outer tube 2111. The second end of the inner tube 2112 is opposite to the first end of the inner tube 2112 and protrudes out from the second opening of the outer tube 2111.

The pillar 2113 has a first end and a second end. The first end of the pillar 2113 communicates with a corresponding one of the air holes of the pump mount 144. The second end of the pillar 2113 is opposite to the first end of the pillar 2113, is inserted into the first opening of the outer tube 2111 and is screwed with the inner surface of the outer tube 2111. The nozzle passage 2114 is axially formed through the main body 211. Namely, the nozzle passage 2114 is axially formed through the outer tube 2111, the inner tube 2112 and the pillar 2113.

The pin 212 has a base portion 2121, a needle portion 2122, and multiple vents 2123. The base portion 2121 is screwed with the inner surface of the inner tube 2112. The needle portion 2122 is axially connected with the base portion 2121 and protrudes out from the second end of the inner tube 2112. An outer diameter of the needle portion 2122 is smaller than an inner diameter of the inner tube 2112. The vents 2123 are formed through the base portion 2121 and are parallel to an axis of the base portion 2121.

The pin spring 213 is compressibly mounted in the nozzle passage 2114 and abuts the base portion 2121 and the pillar 2113.

The cap 214 is resilient, is mounted around the second end of the inner tube 2112 and has a distal end. Preferably, the needle portion 2122 protrudes from the distal end of the cap 214.

The valve 22 faces and aligns with the needle portion 2122 of the nozzle 21 and has a chunk 221, a ball 222 and a ball spring 223. The chunk 221 has a side, a cap receiving section 2211 and a valve hole 2212. The cap receiving section 2211 is formed on the side of the chunk 221, faces the needle portion 2122 and has a shape fitting with that of the distal end of the cap 214. The valve hole 2212 is axially formed through the chunk 221. The ball 222 is mounted in the valve hole 2212 and partially protrudes from the cap receiving section 2211. The ball spring 223 is compressibly and axially mounted in the valve hole 2212, presses the ball 222 and the power chuck 13, and provides a force that enables the ball 222 to press the chunk 221. Preferably, the shape of the distal end of the cap 214 is convex and the shape of the cap receiving section 2211 is concave.

Figure 5:
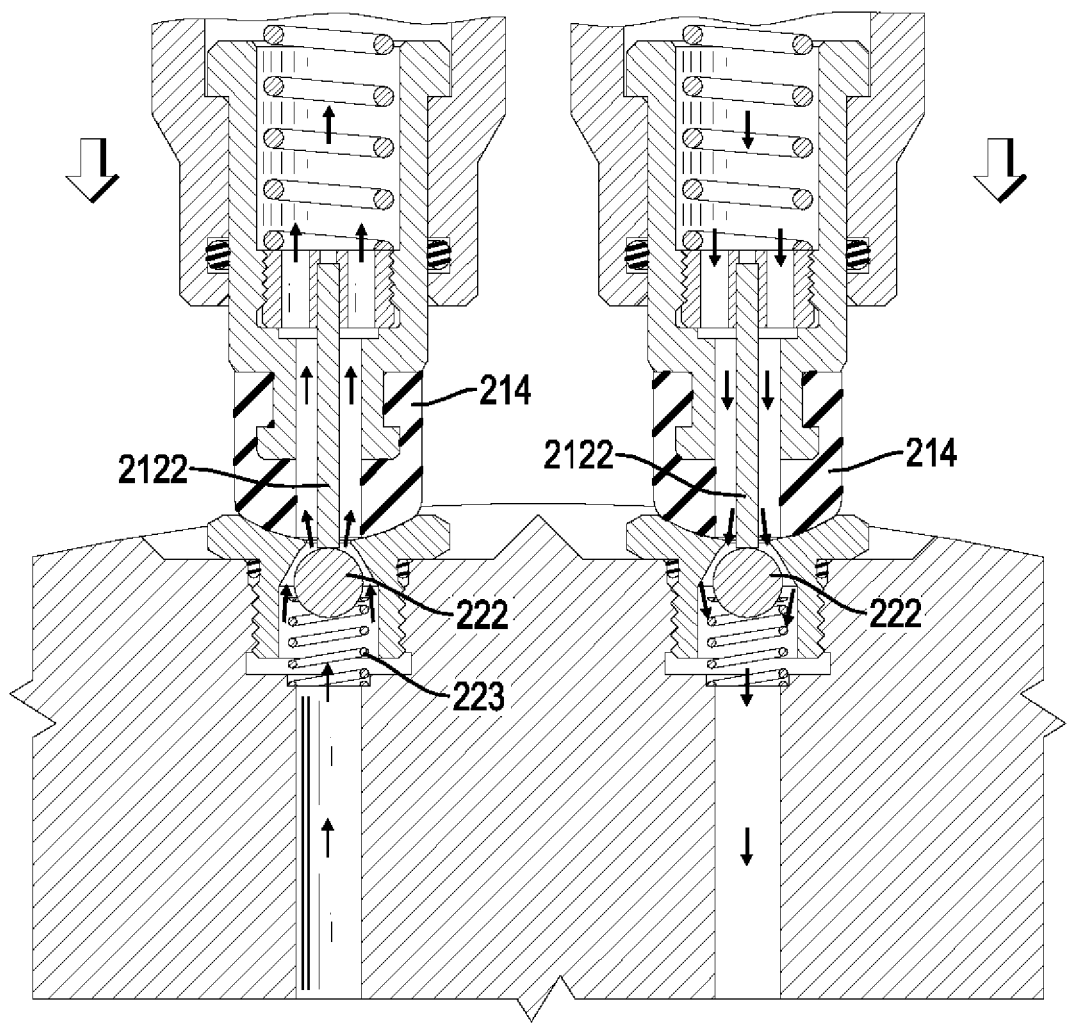
FIG. 5 is an enlarged operational cross sectional side view of the air pump assembly for a power chuck in FIG. 4.

With reference to FIGS. 4 and 5, one of the nozzles 21 blows air into the power chuck 13 and the other of the nozzles 21 draws air out of the power chuck 13 such that jaws of the power chuck 13 can be driven to move.

Taking the nozzle 21 blowing air into the power chuck 13 for an example, the pump mount 144 is connected with at least one air source and the spindle 12 is stopped from rotating. The frame 143 and the nozzle 21 are driven to move toward the valve 22 by the cylinder 142.

When the cap 214 abuts the cap receiving section 2211 of the chunk 221, the needle portion 2122 downwardly pushes the ball 222. Accordingly, the ball 222 is descended and the ball spring 223 is compressed. Meanwhile, the needle portion 2122 is also pushed by the ball 222 and the ball spring 223. Thus, the needle portion 2122 and the base portion 2121 are ascended and the pin spring 213 is compressed.

The air source blows air into the power chuck 13 via the nozzle passage 2114, a gap between the needle portion 2122 and the inner tube 2112, a gap between the ball 222 and the valve hole 2212, the chuck opening 131, and consequently into the chuck passage 132 in sequence.

The operation of the nozzle 21 drawing air out of the power chuck 13 is substantially the same as that of the nozzle 21 blowing air into the power chuck 13, but the air flowing direction of the nozzle 21 is opposite to that of the other nozzle 21.

Figure 7:
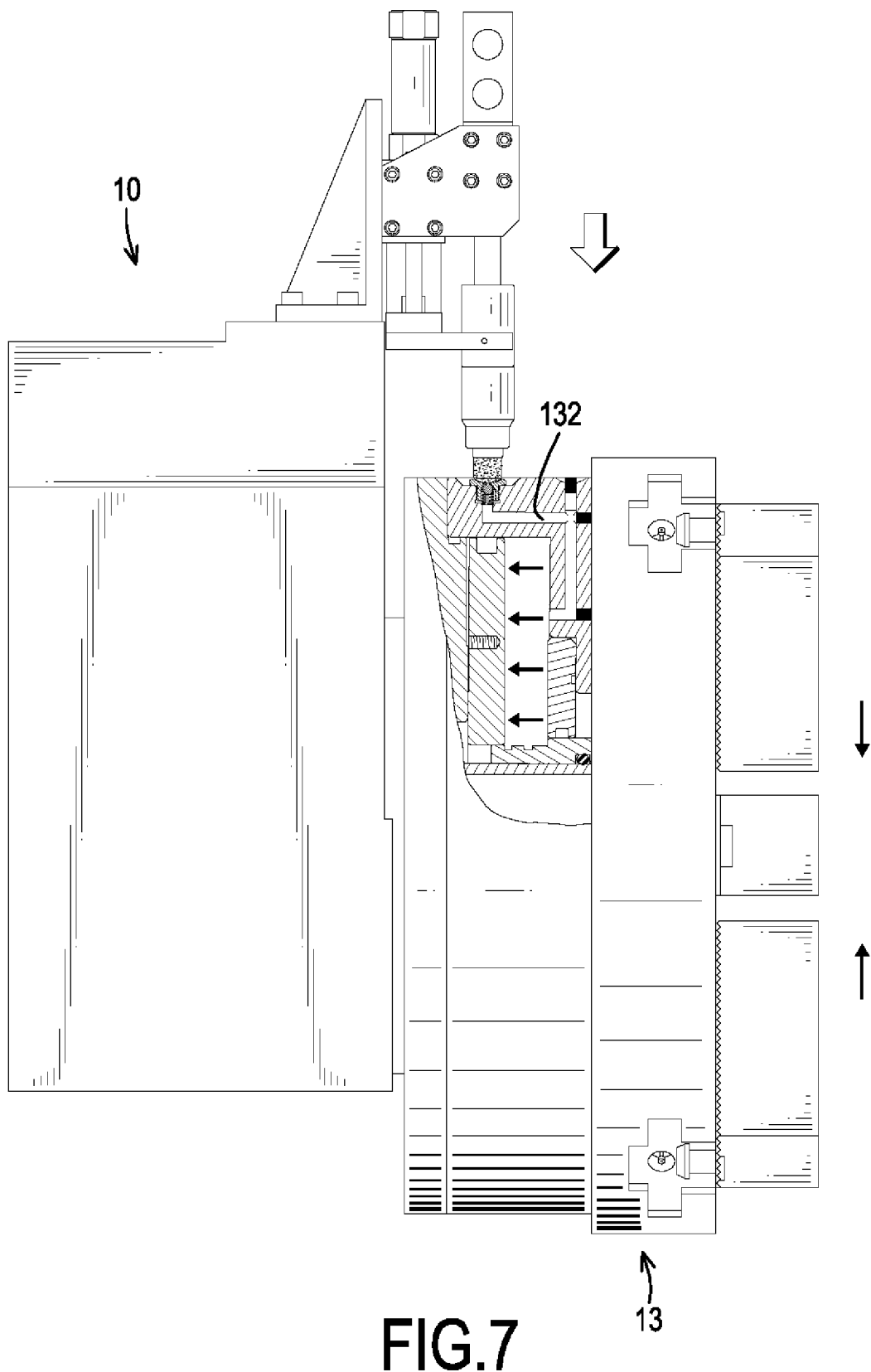
FIG. 7 is an operational side view in partial section of the air pump assembly for a power chuck in FIG. 6.

With reference to FIGS. 6 and 7, the air flows into the chuck passage 132 to move the jaws of the power chuck 13 by air pressure. Then, the nozzles 21 are ascended to depart from the valves 22, and the air injection process is finished.

Moreover, the air pump assembly can be applied to another type of power chuck 13 and both of the nozzles 21 may blow air into the power chuck 13 to move the jaws of the power chuck 13.

From the above description, it is noted that the present invention has the following advantages:

1. Reduction of Costs:

The manufacture of the air jet devices 20 is easy and convenient. Thus, the manufacturing cost of the air pump assembly in accordance with the present invention is inexpensive. Besides, mounting the air pump assembly is also fast and convenient. Accordingly, labor and time consumption is low and the mounting cost of the air pump assembly is reduced.

2. Good Airtight Effect:

With the convex distal end of the cap 214 and the concave cap receiving section 2211, the contacting area between the cap 214 and the cap receiving section 2211 increases such that the contacting area is large and can effectively prevent air leakage.

Because the needle portion 2122 protrudes from the distal end of the cap 214, the needle portion 2122 pushes the ball 222 before the cap 214 abuts the cap receiving section 2211. Accordingly, the cap 214 is not deformed greatly by the cap receiving section 2211, and a gap between the cap 214 and the cap receiving section 2211 is avoided.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An air pump assembly for a power chuck, capable of being mounted on a spindle head of a tooling machine, and comprising:
    a frame capable of moving linearly; and
    two air jet devices arranged independently and securely mounted on the frame, each air jet devices having:
        a nozzle securely mounted on the frame and having:
            a main body having:
                an outer tube having:
                    a first opening;
                    a second opening opposite to the first opening of the outer tube; and
                    an inner surface;
                an inner tube having:
                    a first end located within the inner surface of the outer tube of the outer tube;
                    a second end opposite to the first end of the inner tube and protruding out from the second opening of the outer tube; and
                    an inner surface;
                a pillar having:
                    a first end; and
                    a second end opposite to the first end of the pillar, inserted into the first opening of the outer tube and screwed with the inner surface of the outer tube; and
                a nozzle passage axially formed through the main body;
            a pin having:
                a base portion screwed with the inner surface of the inner tube;

a needle portion axially connected with the base portion and protruding out from the second end of the inner tube, wherein an outer diameter of the needle portion is smaller than an inner diameter of the inner tube; and a vent formed through the base portion and parallel to an axis of the base portion;

a pin spring compressibly mounted in the nozzle passage and abutting the base portion and the pillar; and a resilient cap mounted around the second end of the inner tube and having a distal end; and a valve facing and aligning with the needle portion of the nozzle and having:

a chunk having:

a side;

a cap receiving section formed on the side of the chunk, facing the needle portion and having a shape fitting with that of the distal end of the cap; and a valve hole axially formed through the chunk;

a ball mounted in the valve hole and partially protruding from the cap receiving section; and a ball spring compressibly and axially mounted in the valve hole and providing a force that enables the ball to press the chunk.

2. The air pump assembly for a power chuck as claimed in claim 1, wherein the shape of the distal end of the cap is convex and the shape of the cap receiving section is concave.

3. The air pump assembly for a power chuck as claimed in claim 2, wherein the needle portion protrudes from the distal end of the cap.

4. The air pump assembly for a power chuck as claimed in claim 1, wherein the needle portion protrudes from the distal end of the cap.

* * * * *